US012741281B2

(12) United States Patent
Kim et al.

(10) Patent No.: US 12,741,281 B2
(45) Date of Patent: Sep. 22, 2026

(54) MICROFLUIDIC DEVICE FOR MANUFACTURING UNIFORM NANOPARTICLES

(71) Applicant: MEPSGEN CO., LTD., Seoul (KR)

(72) Inventors: Yong Tae Kim, Seoul (KR); Hoon Suk Rho, Seoul (KR)

(73) Assignee: MEPSGEN CO., LTD., Seoul (KR)

( * ) Notice: Subject to any disclaimer, the term of this patent is extended or adjusted under 35 U.S.C. 154(b) by 0 days.

(21) Appl. No.: 19/340,958

(22) Filed: Sep. 26, 2025

(65) Prior Publication Data

US 2026/0021485 A1 Jan. 22, 2026

Related U.S. Application Data

(63) Continuation of application No. PCT/KR2024/003110, filed on Mar. 11, 2024.

(30) Foreign Application Priority Data

Mar. 29, 2023 (KR) ........................ 10-2023-0041478

(51) Int. Cl.
*B01L 3/00* (2006.01)

(52) U.S. Cl.
CPC . *B01L 3/502746* (2013.01); *B01L 2300/0861* (2013.01); *B01L 2300/0864* (2013.01)

(58) Field of Classification Search
CPC ....... B01L 3/502746; B01L 2300/0861; B01L 2300/0864
See application file for complete search history.

(56) References Cited

U.S. PATENT DOCUMENTS

2025/0000810 A1* 1/2025 Lee ..................... B01F 23/4105

FOREIGN PATENT DOCUMENTS

| | | | |
|---|---|---|---|
| CN | 108344690 | A | 7/2018 |
| KR | 10-2011-0063579 | A | 6/2011 |
| KR | 10-2018-0103088 | A | 9/2018 |
| KR | 10-2021-0106607 | A | 8/2021 |

(Continued)

OTHER PUBLICATIONS

International Search Report issued in PCT/KR2024/003110, dated Jun. 21, 2024.

(Continued)

*Primary Examiner* — Monica A Huson
(74) *Attorney, Agent, or Firm* — MEDLER FERRO WOODHOUSE & MILLS PLLC

(57) ABSTRACT

The present invention relates to a device useful for producing nanoparticles that include hydrophobic and hydrophilic substances. Specifically, the device according to the present invention is characterized by including: a plurality of inlet channels into which the hydrophobic and hydrophilic substances are respectively introduced; a mixing channel in which the substances are mixed to produce the nanoparticles; and an outlet channel through which the produced nanoparticles are discharged, wherein the mixing channel includes microposts capable of increasing the mixing efficiency of the substances. Therefore, the nanoparticles produced using the device according to the present invention exhibit excellent particle uniformity and can be effectively used as drugs or drug delivery carriers.

16 Claims, 13 Drawing Sheets

(56) References Cited

FOREIGN PATENT DOCUMENTS

| | | | | |
|---|---|---|---|---|
| KR | 10-2023-0018330 A | | 2/2023 | |
| KR | 10-2631907 B1 | | 1/2024 | |
| WO | WO 2023/008875 | * | 2/2023 | ............. B01F 33/30 |

OTHER PUBLICATIONS

Bekard et al., "The Effects of Shear Flow on Protein Structure and Function," *Biopolymers* 95(11): 733-745 (2011).
Johnson et al., "Mechanism for Rapid Self-Assembly of Block Copolymer Nanoparticles," *Physical Review Letters* 91(11): 118302 (2003).
Karnik et al., "Microfluidic Platform for Controlled Synthesis of Polymeric Nanoparticles," *Nano Letters* 8(9): 2906-2912 (2008).
Rhee et al., "Drop Mixing in a Microchannel for Lab-on-a-Chip Platforms," *Langmuir* 24(2): 590-601 (2008).
Valencia et al., "Single-Step Assembly of Homogenous Lipid-Polymeric and Lipid-Quantum Dot Nanoparticles Enabled by Microfluidic Rapid Mixing," *ACS Nano* 4(3): 1671-1679 (2010).

* cited by examiner

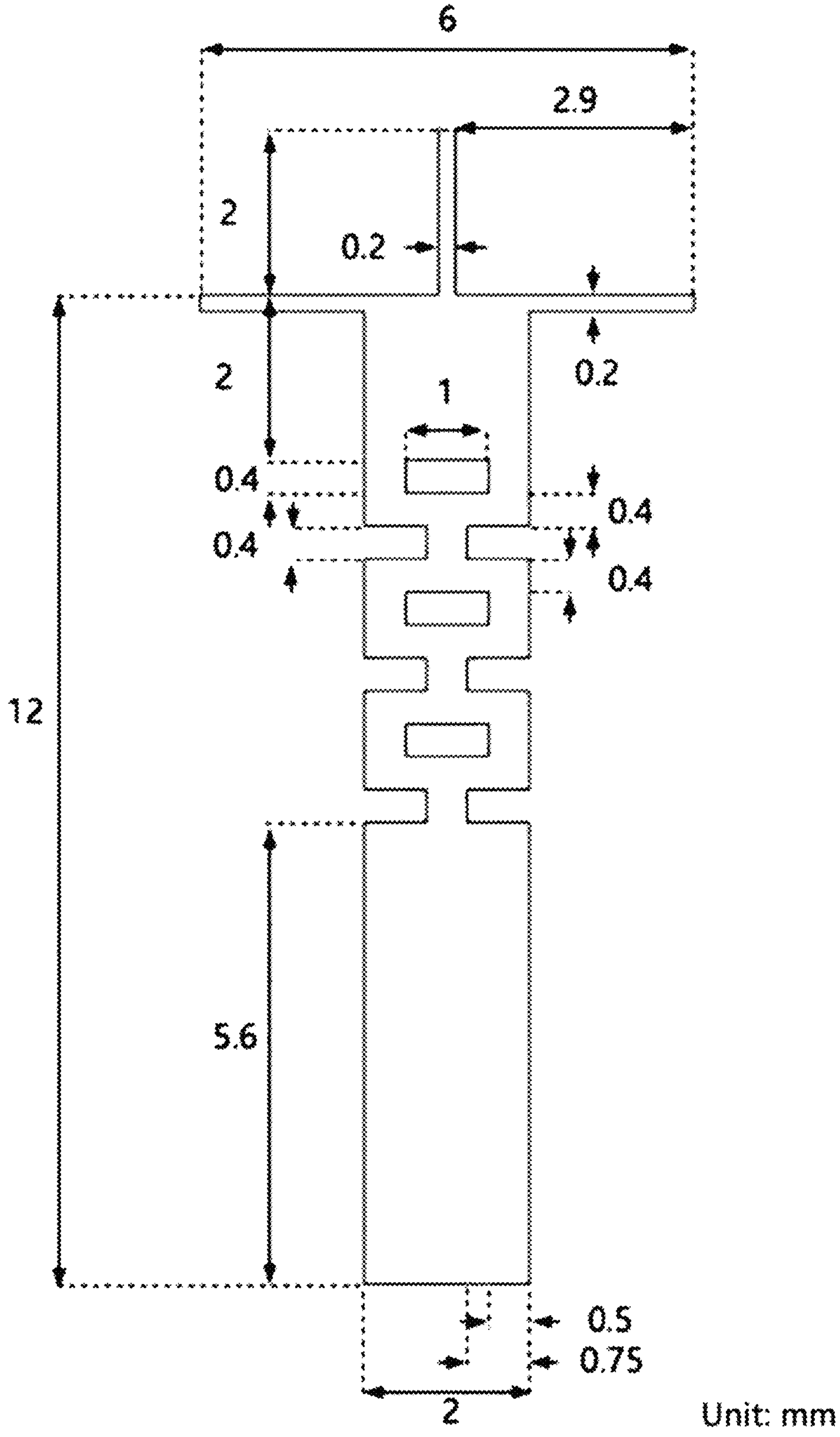
[FIG. 1]

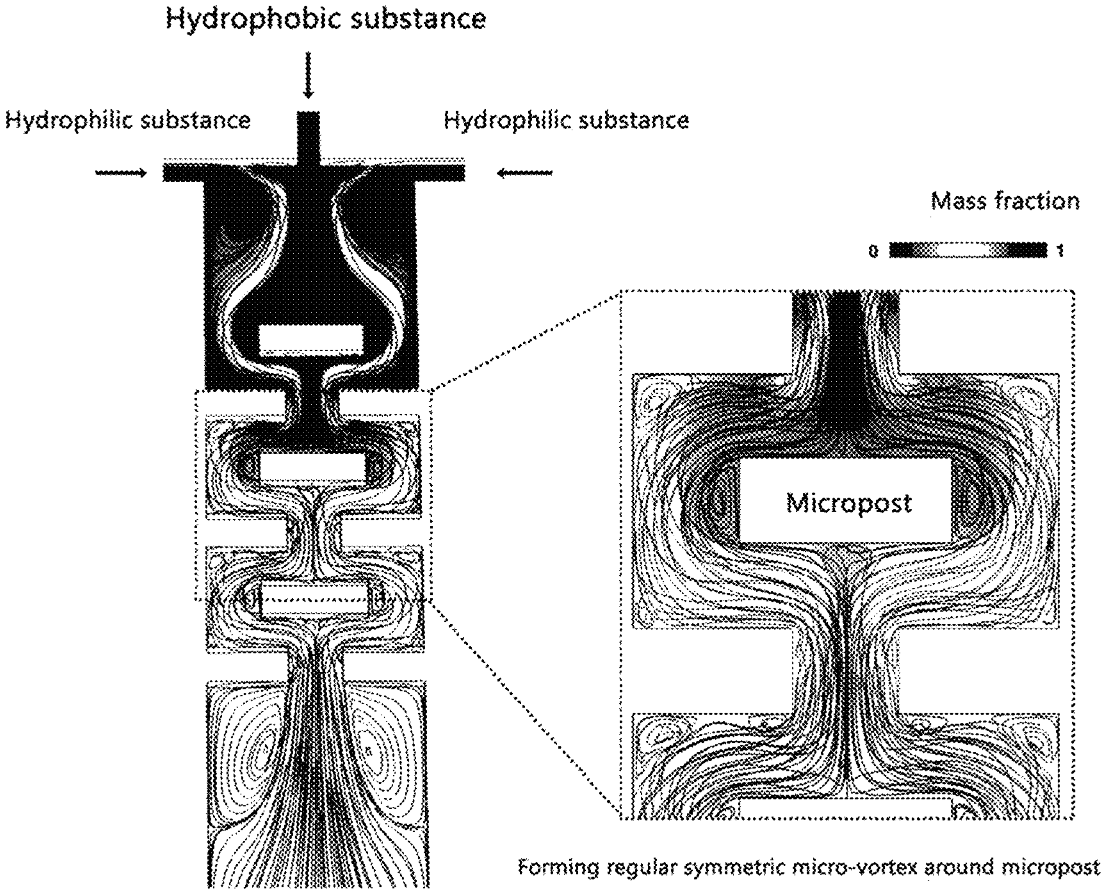
[FIG. 2]

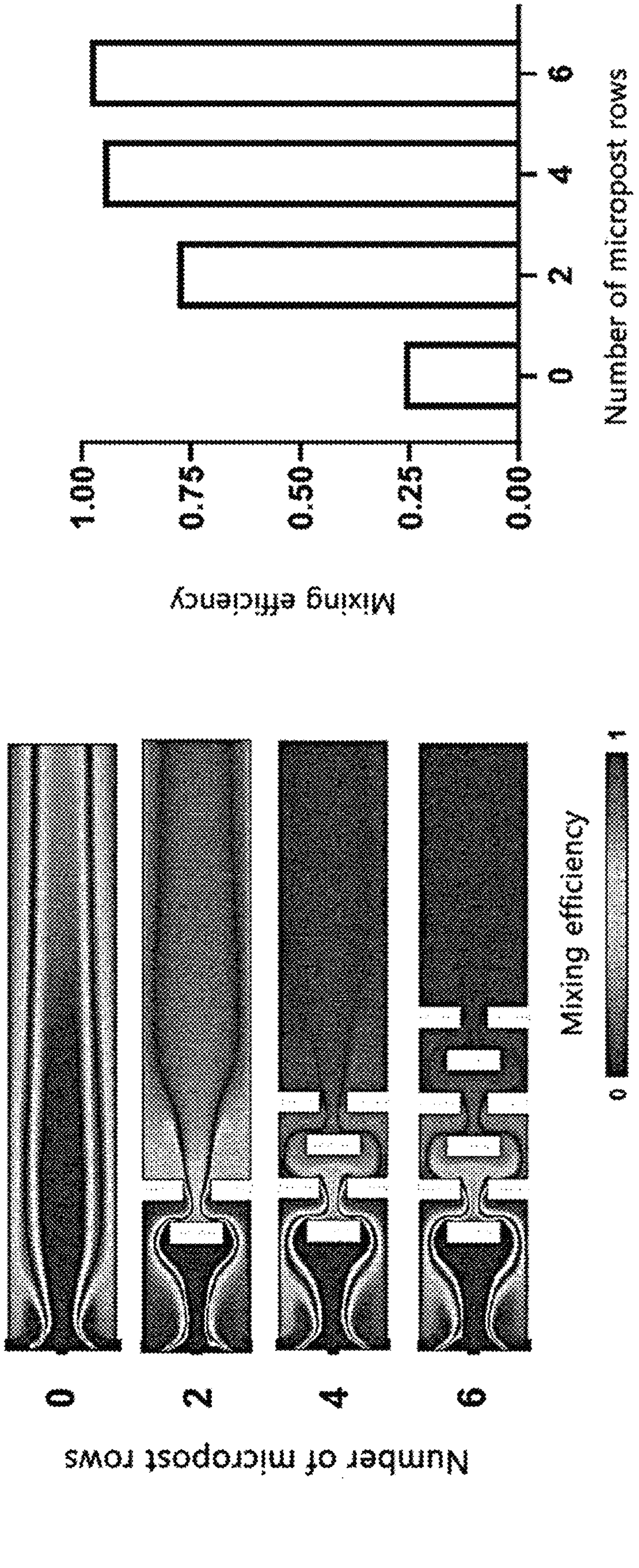
[FIG. 3]

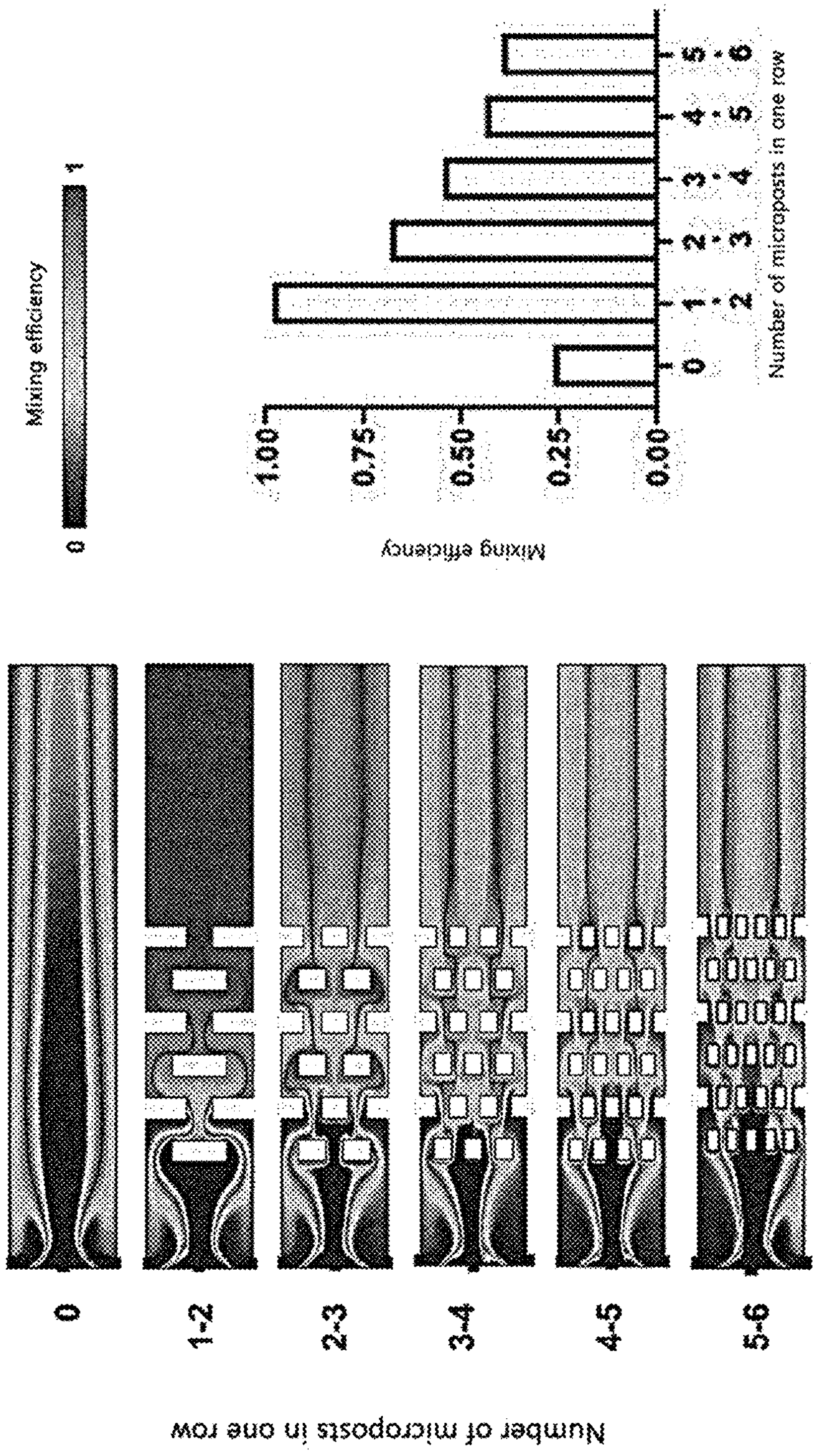
[FIG. 4]

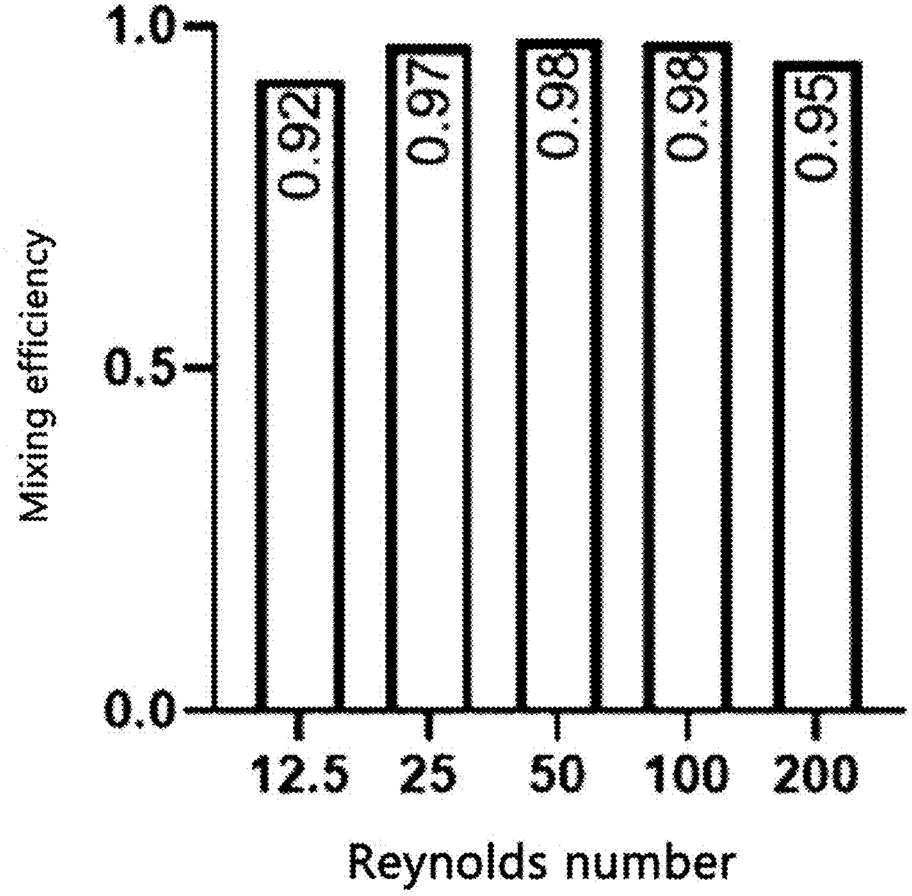
[FIG. 5]

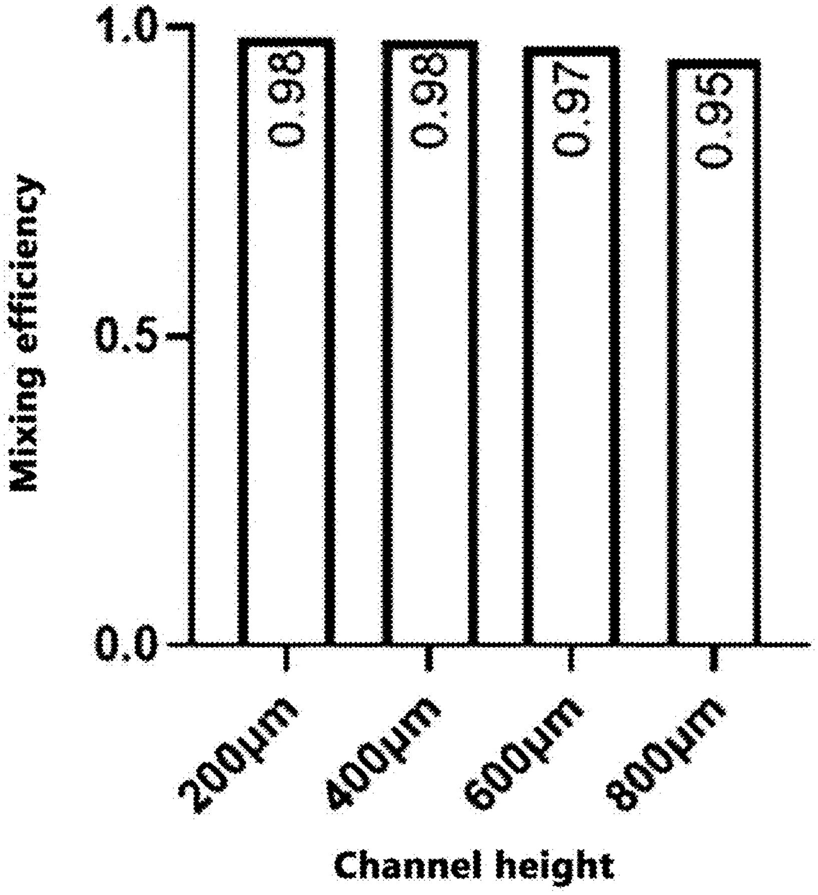
[FIG. 6]

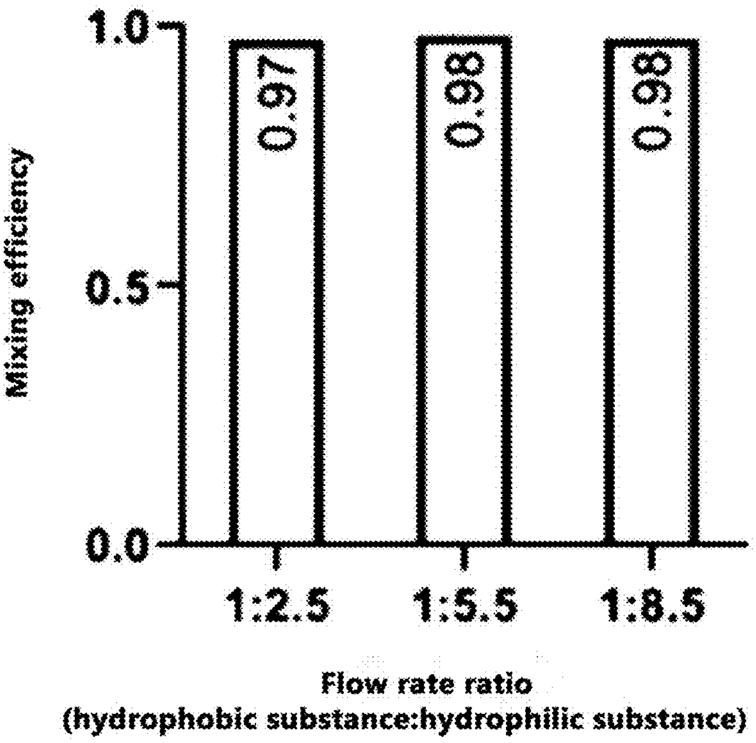
[FIG. 7]

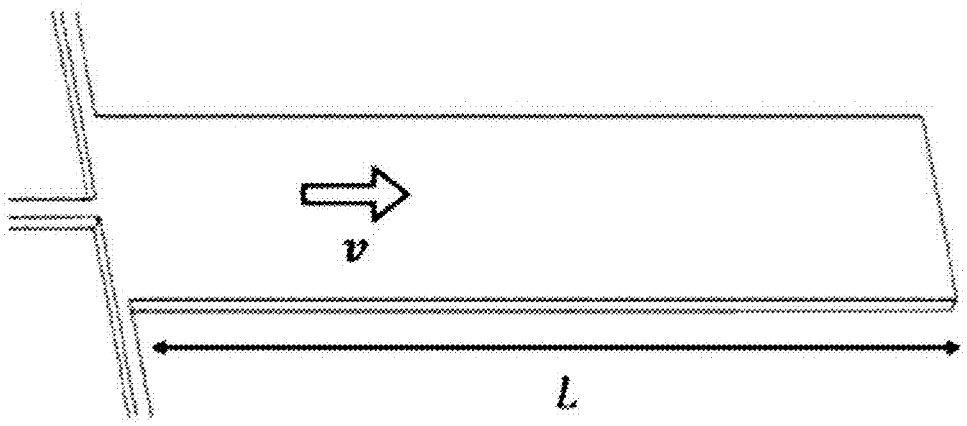
Residence time (τres) of a material in synthetic channel, τres
$$\tau res = \frac{\text{Channel length in fluid flow direction (L)}}{\text{Fluid line velocity (v)}}$$
[FIG. 8]

(a) Visualization of fluid flow in microfluidic device (Preparative Example 1)
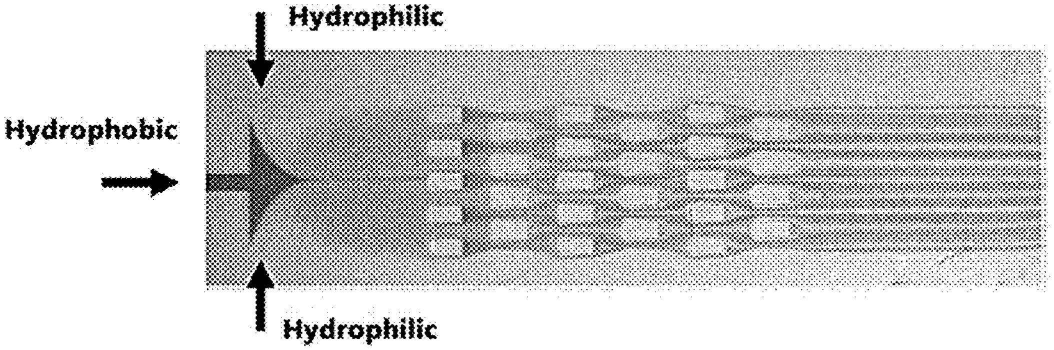
(b) Visualization of fluid flow in microfluidic device (Preparative Example 2)
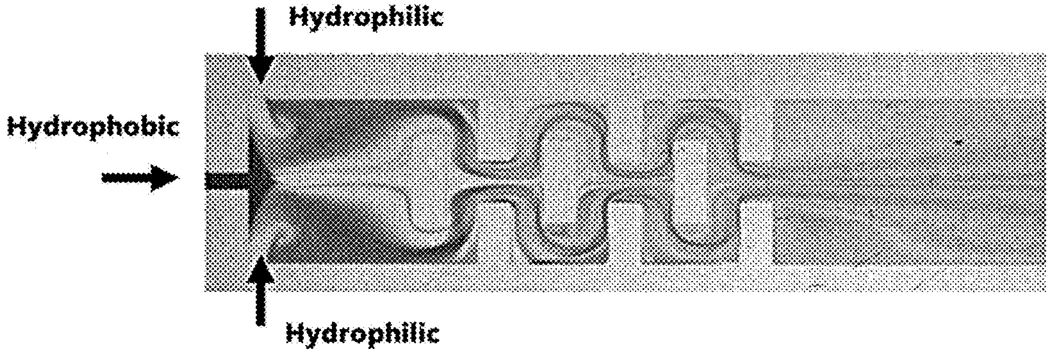
- Hydrophobic organic solution: ethanol (6% ink)
- Hydrophilic aqueous solution: saline
[FIG. 9]

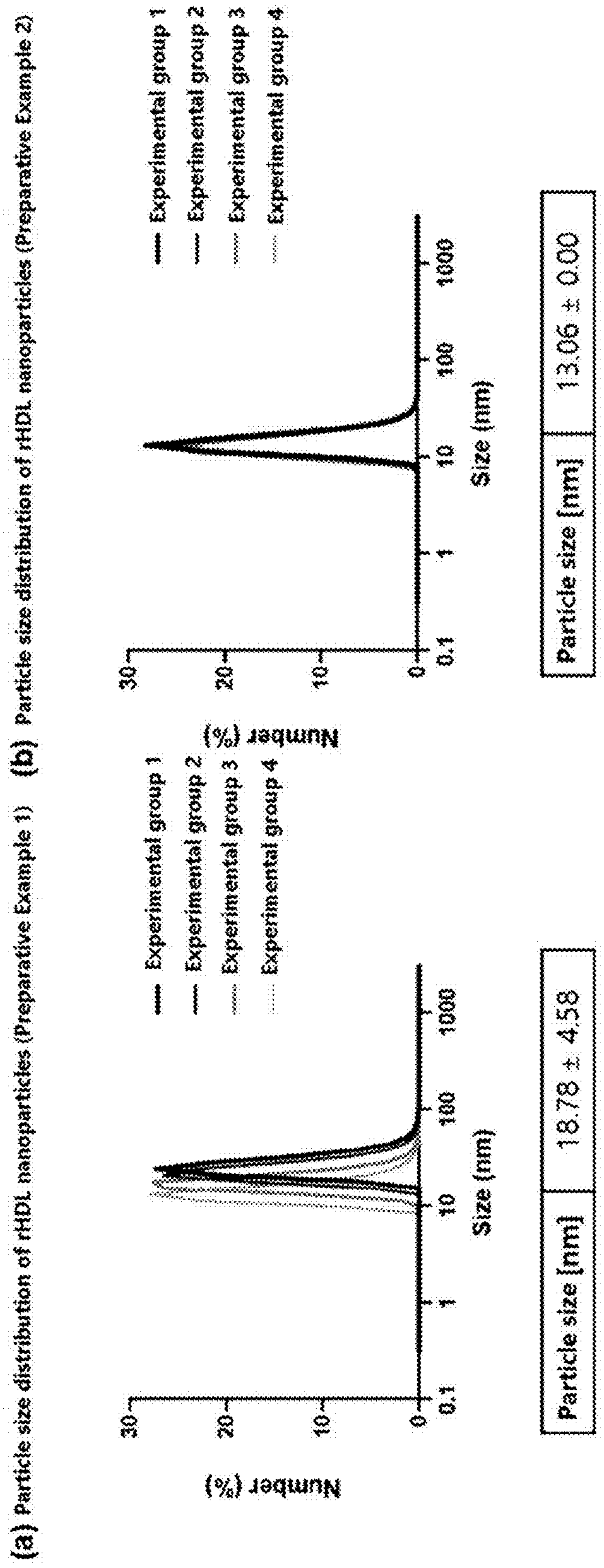
[FIG. 10]

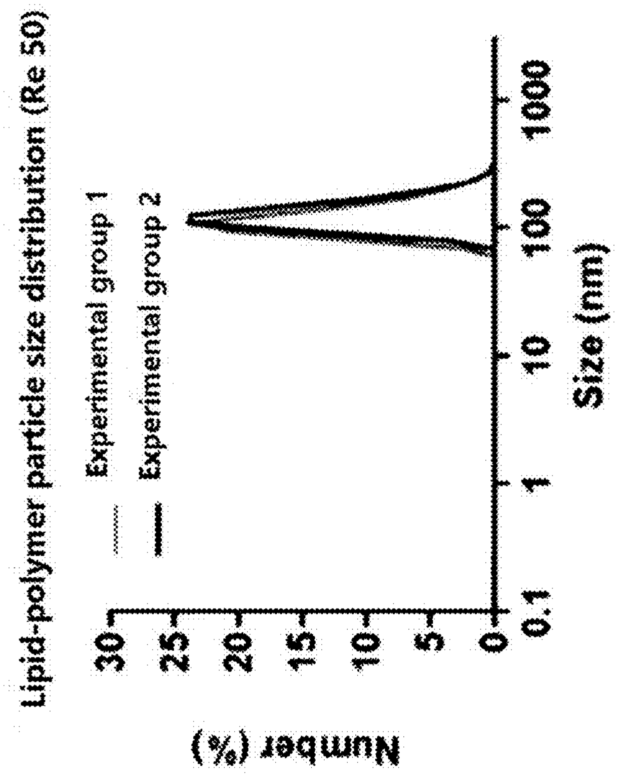
| Particle size [nm] | PDI |
|---|---|
| 124 ± 5.3 | 0.05 ± 0.02 |
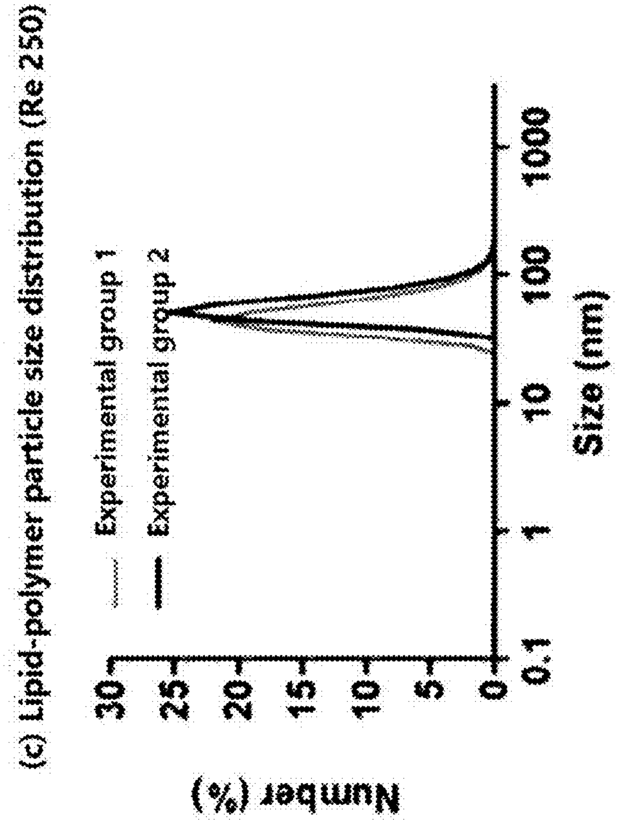
| Particle size [nm] | PDI |
|---|---|
| 56 ± 4.4 nm | 0.13 ± 0.02 |
[FIG. 11]

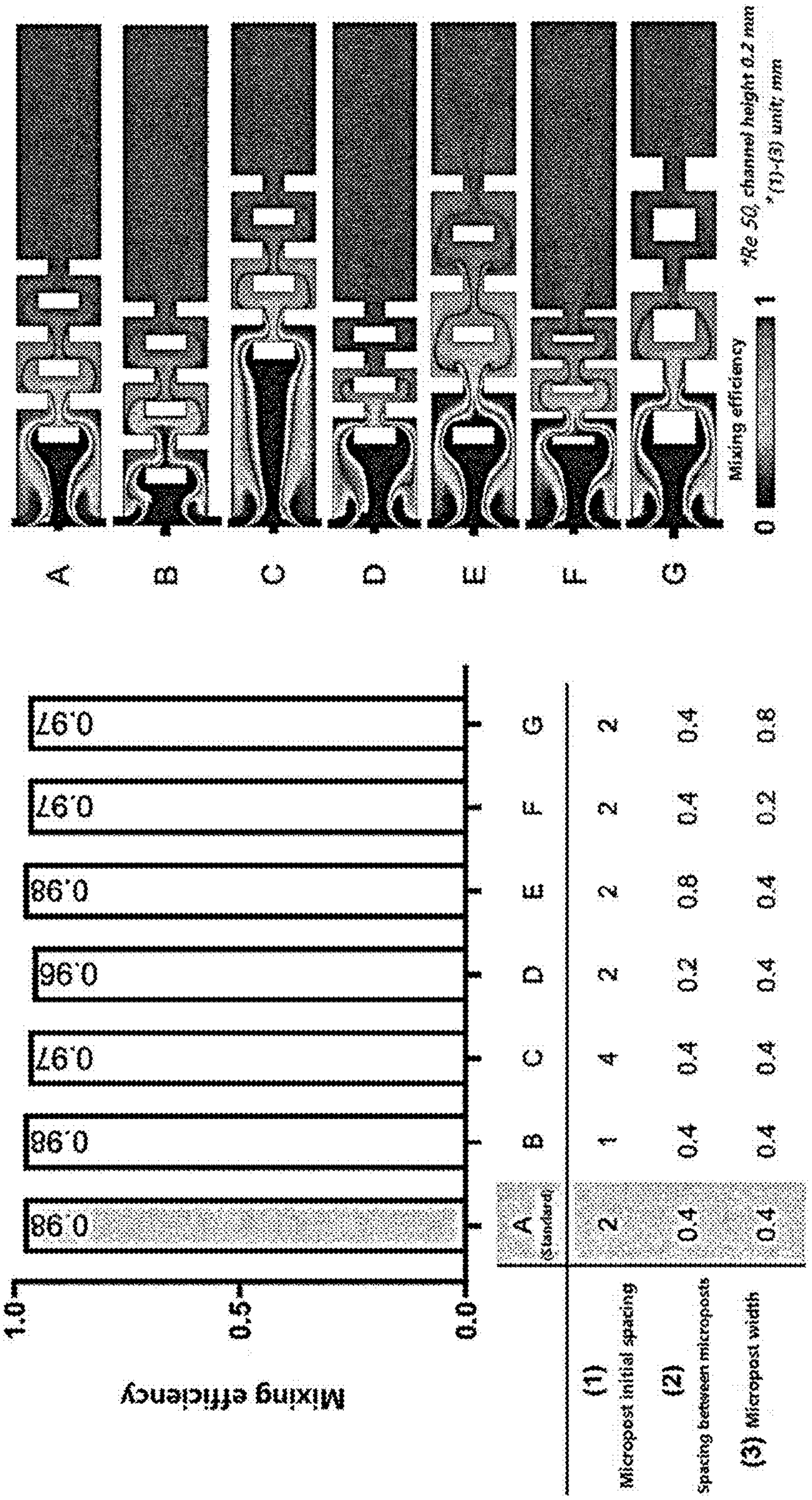
[FIG. 12]

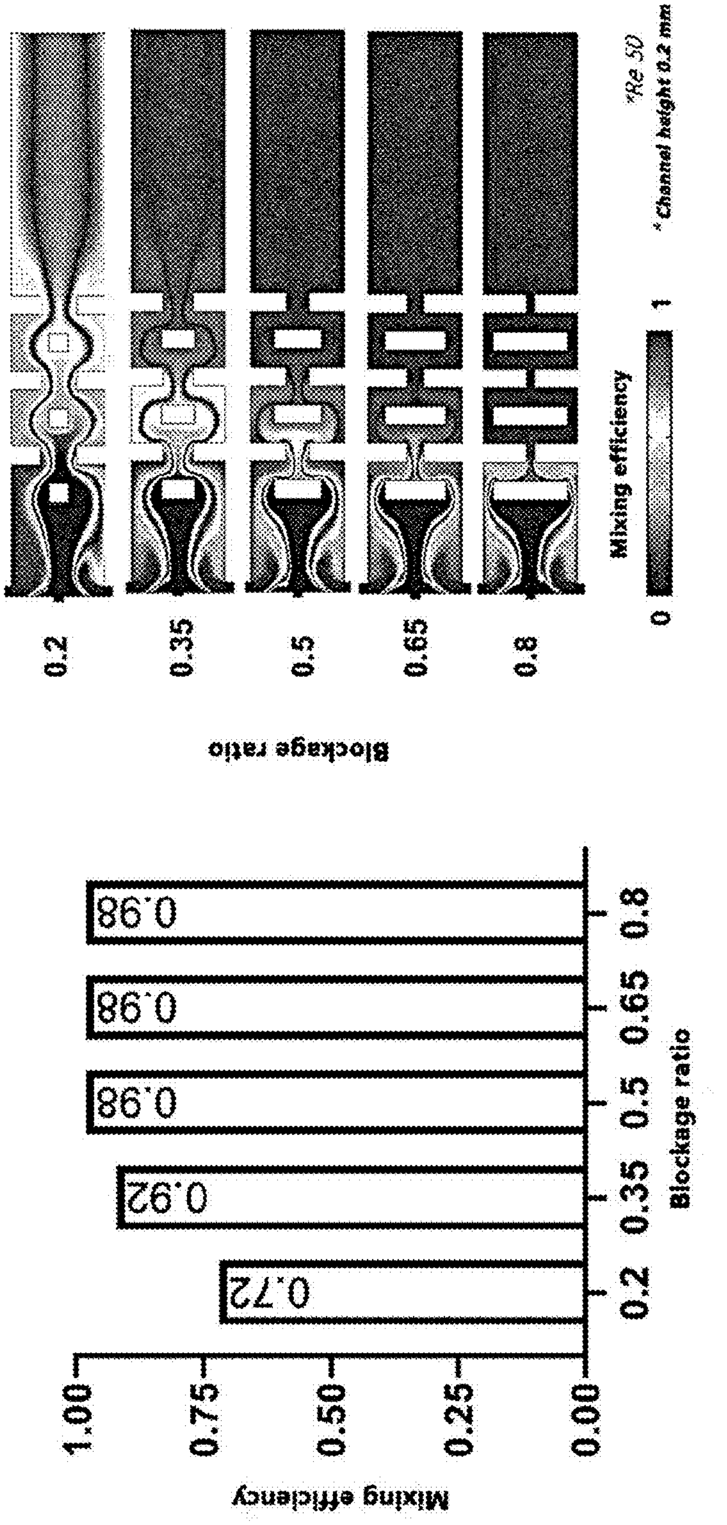
[FIG. 13]

MICROFLUIDIC DEVICE FOR MANUFACTURING UNIFORM NANOPARTICLES

TECHNICAL FIELD

The present invention relates to a novel device useful for producing nanoparticles composed of only hydrophilic substances, as well as nanoparticles containing both hydrophobic substances and hydrophilic substances, and a method for producing uniform nanoparticles using the same. The nanoparticles obtained according to the present invention have excellent particle uniformity and can be effectively used as drugs or drug delivery carriers.

BACKGROUND ART

Many nanomedicines are being developed for targeted delivery of therapeutics and imaging agents for the treatment and diagnosis of major diseases including cancer, cardiovascular disease, diabetes, and Alzheimer's disease. Effective drug delivery systems can improve the absorption of poorly soluble and unstable drugs while increasing the therapeutic efficacy of drugs and reducing the toxic effects of drugs. Furthermore, this has led to the discovery and development of more effective drugs for improving patient prognosis and quality of life.

With the development of nanomedicine technology for drug delivery, many studies have been reported over the past decade, but only a very small number of therapeutic and diagnostic nanomedicines have received FDA approval. The low success rate of nanomedicines may be attributed to the low reproducibility of nanoparticles with desired properties or efficacy and differences in physicochemical properties between batches. The reproducibility and reliability of drug release profiles are important factors for a successful drug delivery system, and these mainly depend on the size and uniformity of nanoparticles. Therefore, there is an increasing demand for the development of technologies that can stably and reproducibly ensure particle size and uniformity during the production process of nanoparticles. In particular, since most drugs delivered in nanomedicines are hydrophobic, it is more difficult to uniformly synthesize hydrophilic substances (such as phospholipids) used as drug carriers, and thus their development has not been achieved. Accordingly, the inventors of the present invention developed a novel device useful for producing nanoparticles composed of only hydrophilic substances, as well as nanoparticles containing both hydrophobic and hydrophilic substances, and successfully produced uniform nanoparticles through the novel device, thereby completing the present invention.

PRIOR ART DOCUMENT

Non-Patent Document (Non-patent document 1) Velencia, P. et al. Single-Step Assembly of Homogenous Lipid-Polymeric and Lipid-Quantum Dot Nanoparticles Enabled by Microfluidic Rapid Mixing. ACS Nano 4, 3, 1671-1679 (2010)

(Non-patent document 2) Rhee, M. et al. Drop Mixing in a Microchannel for Lab-on-a-Chip Platforms. Langmuir, 24 (2), 590-601 (2008).

(Non-patent document 3) Rohit, K. et al. Microfluidic Platform for Controlled Synthesis of Polymeric Nanoparticles. Nano Letters, 8, 9, 2906-12, (2008).

(Non-patent document 4) Johnson, B. K. et al. Mechanism for Rapid Self-Assembly of Block Copolymer Nanoparticles. Physical Review Letters, 91(11), 118302-1-4 (2003).

(Non-patent document 5) Bekard, I., et al. The Effects of Shear Flow on Protein Structure and Function. Biopolymers, 95, 11, 733-745 (2011).

SUMMARY OF INVENTION

Problems to be Solved by Invention

Conventional nanoparticle production methods mainly consist of non-standardized, multi-step processes such as nanoprecipitation and emulsification-based solvent evaporation. Nanoprecipitation, which accounts for more than 50% of nanoparticle production methods, is a method in which a lipophilic or polymer drug dissolved in another hydrophobic solvent is added dropwise to a hydrophilic solvent stirred in a hydrophobic solvent to form nanoparticles from a colloidal suspension between the two solvent phases. The properties of the synthesized particles in this process can be controlled by the agitation speed of the two solvents, the degree of lipophilicity of the polymer drug, and the polymer drip rate. At this time, the particle size is determined by the nonlinear and unpredictable flow of the stirred inlet, which causes polydispersity and large batch-to-batch differences, making it difficult to reproducibly synthesize and produce nanoparticles, and thus requires several additional steps for homogenization of the synthesized nanoparticles.

Recently, microfluidic technology has been applied to the development of drug delivery systems to control intense micro-vortex flow to effectively form drug carriers. Microfluidic technology is widely used in chemical synthesis, chemical and biomolecular analysis, tissue engineering, and other applications because it can precisely control the microenvironment such as the size, shape, and surface composition of nanoparticles by manipulating a small amount of liquid. In particular, microfluidic technology can optimize nanodrug delivery systems by reproducibly and continuously producing high-quality nanoparticles with various combinations of physicochemical properties, and may also promote clinical applications such as promoting or monitoring the effects of drug delivery, release, and elimination in the patient treatment process.

However, despite these advantages, most existing microfluidic nanomedicine synthesis methods still have limitations, such as low productivity due to relatively low flow rates during synthesis and difficulties in mixing different liquid substances. Further, recent efforts have been made to overcome these limitations by increasing the flow rates in microfluidics, but they have been limited to uncontrolled micro-vortex formation through simple straight and curved structures, which restricts the mixing of hydrophilic substances and makes it difficult to achieve effective mixing of hydrophobic and hydrophilic substances. As a result, the production yield of the synthesized nanoparticles is low, or the size of the produced nanoparticles ranges from hundreds of nanometers to several micrometers, which poses a significant limitation for their application as nanomedicines, since they must be uniformly produced to a size of 200 nanometers or less to serve as effective drug delivery carriers.

Means for Solving Problems

Accordingly, the inventors of the present invention have discovered a novel device capable of controlling the size of nanoparticles produced by regulating the flow rate of a fluid and obtaining homogeneous nanoparticles with a high yield, thereby completing the present invention.

The present invention provides a novel device for producing nanoparticles, which includes: a plurality of inlet channels into which hydrophobic substances and hydrophilic substances are respectively introduced; a mixing channel in which the substances are mixed to produce nanoparticles; and an outlet channel through which the produced nanoparticles are discharged, wherein the mixing channel includes microposts that can enhance the mixing efficiency of the introduced substances.

The term "mixing efficiency (Mixeff)" used herein is a value expressed as a percentage based on the fact that hydrophobic and hydrophilic substances each having a 1 mass fraction are mixed with each other in a channel and ultimately converge to 0.5 mass fraction, and the calculation equation is as follows.

$$Mix_{eff} = \begin{cases} 2 \cdot Mass_{fract} & Mass_{fract} \leq 0.5 \\ 2(1 - Mass_{fract}) & Mass_{fract} > 0.5 \end{cases}$$

At this time, Massfract refers to the mass fraction, and the closer the mass fraction is to 0.5, the higher the mixing efficiency is proportionally.

The term "device" or "microfluidic device" as used herein refers to a device including a channel provided to allow a fluid to flow on a substrate made of various materials including plastic, glass, metal or silicon.

In the device of the present invention, the hydrophobic substance and the hydrophilic substance may be introduced through different inlet channels, respectively. Herein, preferably, the hydrophobic substance may be introduced in the same direction as the flow direction of the fluid in the mixing channel, and the hydrophilic substance may be introduced in a direction different from the flow direction of the fluid in the mixing channel.

The inlet channel into which the hydrophobic substance is introduced may be one or more, and the inlet channel into which the hydrophilic substance is introduced may be one or more. Preferably, the device of the present invention may include one inlet channel into which the hydrophobic substance is introduced and two inlet channels into which the hydrophilic substance is introduced.

The term "micropost" as used herein refers to a structure that disrupts the straight flow of fluid within a mixing channel. The micropost of the present invention is a structure for efficiently mixing fluids introduced into the device by forming microvortices, and may include any shape, and is preferably a columnar shape. The micropost may be designed to separate or bend the flow of fluids striking the micropost, or to merge them with different flows. The micropost may be designed to maintain the main flow of the fluid and prevent the flow from stagnating, and may, for example, intersect the fluid at a right angle with respect to the direction of flow of the fluid.

The micropost of the present invention has a shape having an edge capable of changing the flow of the fluid, and may be polyhedra, truncated polyhedra, polygonal columns, and modified shapes thereof, and preferably a square column. Further, when viewed in cross section cut along the flow direction of the fluid within the mixing channel, it may be a polygon or a modified shape thereof, and preferably a rectangle having one side in a direction perpendicular to the flow direction of the fluid (horizontal) and one side in the same direction (vertical) as the flow direction of the fluid within the mixing channel.

In the present invention, the "flow direction of the fluid in the mixing channel" or "flow direction in the mixing channel" refers to the direction in which the fluid flows from the inlet channel to the outlet channel within the device. Preferably, the hydrophobic substance is introduced through the inlet channel arranged in the same direction as the flow direction in the mixing channel, and the hydrophilic substance is introduced through the inlet channel arranged in a direction perpendicular to the flow direction in the mixing channel.

The microposts of the present invention may be arranged in one or more rows along the direction of flow of the fluid in the mixing channel. Specifically, the microposts may be arranged in one, two, three, four, five, or six or more rows along the direction of flow of the fluid, and preferably may be arranged in six rows.

The microposts of the present invention may be arranged in one or more units in a direction different from the flow direction of the fluid in the mixing channel (preferably in an orthogonal direction) within a single row. The number of microposts present in each row may be the same or may vary from row to row.

In the present invention, the microposts may be arranged in an alternating manner with respect to the microposts in adjacent rows. As used herein, the term "arranged in an alternating manner" means that the microposts in the plurality of rows are not aligned in a straight line or arranged in a single parallel row in the flow direction of the fluid. Instead, the microposts arranged in one row may be positioned to partially or completely block the gaps between the microposts arranged in adjacent rows when viewed in the flow direction of the fluid.

In the present invention, the micropost may have a height of 200 to 800 μm, and the micropost may or may not be connected to the walls forming the mixing channel.

In the present invention, the "inlet volume flow rate ratio" refers to the ratio of the inlet volume flow rate of a fluid containing a hydrophilic substance to the inlet volume flow rate of a fluid containing a hydrophobic substance.

In the present invention, the term "flow blockage ratio" refers to the ratio of the width of the micropost to the width of the entire channel in the first row along the flow direction of the fluid in the mixing channel.

In general, the flow rate within a device may be expressed by the Reynolds number (Re), which is a dimensionless number representing the ratio of inertial force to viscous force, and the calculation formula is as follows:

$$Re = \frac{\rho v D_h}{\mu} = \frac{\rho v}{\mu}\frac{2wh}{w+h} = \frac{\rho}{\mu}\frac{2Q}{w+h}$$

Herein, Dh is the hydraulic diameter within the microfluidic device, and ρ, μ, v and Q represent the density, dynamic viscosity, velocity, and flow rate of the fluid, respectively. Therefore, as the Reynolds number increases, the flow rate increases proportionally.

The Reynolds number in the device of the present invention may be 500 or less, preferably 10 to 300, more preferably 12.5 to 200, and most preferably 50 to 100. When the Reynolds number exceeds 500, a turbulence-like flow is formed within the device, so that a controllable vortex pattern is not generated, and an increase in shear force between the solvent and the substance due to the high flow rate may cause instability of the raw drug substance and the generated nanoparticles. When the Reynolds number is 300 or more, uncontrollable chaotic flow begins to occur within the device, making quality control for producing uniform nanoparticles difficult. On the other hand, when the Reynolds number is as low as 10 or less, the process becomes dependent on diffusion, making it difficult to achieve effective mixing of hydrophobic and hydrophilic substances, and thus difficult to obtain superior productivity compared with that of conventional nanoparticle synthesis methods.

The device of the present invention may regulate the particle size by changing the Reynolds number.

Further, the present invention provides a method for producing nanoparticles including a hydrophobic substance and a hydrophilic substance using the device.

Specifically, the present invention provides a method for producing uniform nanoparticles including a hydrophobic substance and a hydrophilic substance, using a device including a plurality of inlet channels, a mixing channel, and an outlet channel, the method including: (a) introducing a hydrophobic substance and a hydrophilic substance into each of the inlet channels, (b) colliding the substances with microposts in the mixing channel to form vortices, thereby producing nanoparticles, and (c) discharging the produced nanoparticles through the outlet channel.

The hydrophobic substance of the present invention may be one or more selected from the group consisting of poly(lactic-co-glycolic acid) (PLGA), polyethylene glycol (PEG), DSPE-PEG, 1,2-dioleoyl-sn-glycero-3-phosphatidylcholine (DOPC), egg phosphatidylcholine (EPC), dilauroylphosphatidylcholine (DLPC), 1,2-dimyristoyl-sn-glycero-3-phosphocholine (DMPC), dipalmitoylphosphatidylcholine (DPPC), distearoylphosphatidylcholine (DSPC), 1-myristoyl-2-palmitoylphosphatidylcholine (MPPC), 1-palmitoyl-2-myristoylphosphatidylcholine (PMPC), 1-palmitoyl-2-stearoylphosphatidylcholine (PSPC), 1-stearoyl-2-palmitoylphosphatidylcholine (SPPC), 1,2-distearoyl-sn-glycero-3-phosphocholine (DAPC), 1,2-diarachidoyl-sn-glycero-3-phosphocholine (DBPC), 1,2-diicosanoyl-sn-glycero-3-phosphocholine (DEPC), palmitoyloleoylphosphatidylcholine (POPC), lysophosphatidylcholine, dilinoleoylphosphatidylcholine, distearoylphosphatidylethanolamine (DSPE), dimyristoylphosphatidylethanolamine (DMPE), dipalmitoylphosphatidylethanolamine (DPPE), palmitoyloleoylphosphatidylethanolamine (POPE), lysophosphatidylethanolamine, N1-[2-((1S)-1-[(3-aminopropyl)amino]-4-[di (3-amino-propyl)amino]butylcarboxamido)ethyl]-3,4-di [oleyloxy]-benzamide) (VL-5), dioctadecylamidoglycolspermine 4-tetrafluoroacetate (DOGS), 3β-[N—(N',N'-dimethylaminoethane)-carbamoyl] cholesterol (DC-Chol), 1,2-di-O-octadecenyl-3-trimethylammonium propane (DOTMA), 1,2-dioleyl-3-trimethylammonium-propane (DOTAP), (1,2-dioleyloxypropyl)-3-dimethylhydroxyethyl ammonium bromide (DORIE), 1,2-dimyristyloxy-propyl-3-dimethyl-hydroxyethyl ammonium bromide (DMRIE), 2,3-dioleyloxy-N-[2(sperminecarboxamido)ethyl]-N,N-dimethyl-1-propanaminium trifluoroacetate (DOSPA), N-(3-aminopropyl)-N,N-dimethyl-2,3-bis (dodecyloxy)-1-propanammonium bromide (GAP-DLRIE), N-t-butyl-N'-tetradecyl-3-tetradecylaminopropionamidine (diC14-amidine), ethylphosphocholine (Ethyl PC), dimethyldioctadecylammonium bromide (DDAB), N4-cholesteryl-spermine (GL67), 1,2-dioleyloxy-3-dimethylaminopropane (DODMA), D-Lin-MC3-DMA (MC3, DLin-MC3-DMA), DLin-KC2-DMA and DLin-DMA, and may include both high molecular weight hydrophobic substances and low molecular weight hydrophobic substances, without limitation.

The hydrophilic substance of the present invention may be a protein or a polymer, preferably apolipoprotein, more preferably apolipoprotein A or E.

Nanoparticles containing phospholipids, apolipoproteins, and polymers may be produced using the device of the present invention and the production method according to the present invention.

Advantageous Effects

The device of the present invention and the method for producing nanoparticles using the same have the effect of continuously synthesizing nanoparticles with uniform size in a single step and mass-producing nanoparticles with consistent characteristics due to low batch-to-batch variability. The nanoparticles thus obtained exhibit excellent particle uniformity and, since they do not contain additional components such as surfactants, may be advantageously used as drugs or drug delivery carriers.

BRIEF DESCRIPTION OF DRAWINGS

FIG. 1 shows the flow of fluid through the device of the present invention and the flow of fluid around the microposts.

FIG. 2 is a schematic diagram of the device of the present invention.

FIG. 3 shows the results of measuring the mixing efficiency according to the number of micropost rows in the device of the present invention.

FIG. 4 shows the results of measuring the mixing efficiency according to the number of microposts present in one row in the device of the present invention.

FIG. 5 shows the results of measuring the mixing efficiency according to changes in the Reynolds number in the device of the present invention.

FIG. 6 shows the results of measuring different mixing efficiencies according to changes in the channel heights in the device of the present invention.

FIG. 7 shows the results of measuring the mixing efficiency according to the injection ratio of hydrophobic and hydrophilic substances in the device of the present invention.

FIG. 8 shows a method for calculating the residence time of a fluid.

FIG. 9 shows the fluid flow within the device according to Preparative Examples 1 and 2 of the present invention.

FIG. 10 shows the particle size distribution of nanoparticles when producing rHDL nanoparticles according to Preparative Examples 1 and 2 of the present invention.

FIG. 11 shows the particle size distribution of lipid-polymer nanoparticles produced by the production method of the present invention.

FIG. 12 shows the flow pattern of the fluid passing through the microposts and the mixing efficiency according to the spacing and longitudinal length conditions of the microposts in the device of the present invention.

FIG. 13 shows the mixing efficiency according to the flow blockage ratio of the microposts in the device of the present invention.

MODE FOR CARRYING OUT INVENTION

Hereinafter, embodiments and examples of the present invention will be described in detail with reference to the accompanying drawings so that those skilled in the art can easily implement the present invention. However, the present invention may be implemented in various forms and is not limited to the embodiments and examples described herein.

Throughout this specification, when a part is said to "include" a component, this does not mean that it excludes other components, but rather that it may include other components, unless otherwise specifically stated.

The present invention relates to a device for producing nanoparticles, characterized in that it includes an inlet channel, a mixing channel and an outlet channel, wherein the mixing channel includes microposts.

Further, the present invention relates to a method for producing nanoparticles, using a device for producing nanoparticles, characterized in that the device includes an inlet channel, a mixing channel, and an outlet channel, wherein the mixing channel includes microposts, the method including: introducing a hydrophobic substance and a hydrophilic substance into the inlet channel; forming a vortex by the microposts in the mixing channel with the substances; and forming nanoparticles including the hydrophobic substance and the hydrophilic substance, and nanoparticles obtained by the method.

The inlet channel, mixing channel and outlet channel may be arranged sequentially in the direction of fluid flow.

The inlet channel may include a channel through which a hydrophilic substance is introduced and a channel through which a hydrophobic substance is introduced, and the hydrophilic substance and the hydrophobic substance may each be introduced into separate inlet channels.

The hydrophobic substance may be introduced in the same direction as the flow direction of the fluid, and the hydrophilic substance may be introduced in a direction different from the flow direction of the fluid. Preferably, the hydrophobic substance may be introduced in the same direction as the flow direction of the fluid, while the hydrophilic substance may be introduced in a direction perpendicular to the flow direction of the fluid.

The inlet volume flow rate ratio of the hydrophobic substance and the hydrophilic substance may be 1:2.5 to 1:8.5 (v/v).

The hydrophobic substance may be one or more selected from the group consisting of poly(lactic-co-glycolic acid) (PLGA), polyethylene glycol (PEG), DSPE-PEG, 1,2-dioleoyl-sn-glycero-3-phosphatidylcholine (DOPC), egg phosphatidylcholine (EPC), dilauroylphosphatidylcholine (DLPC), 1,2-dimyristoyl-sn-glycero-3-phosphocholine (DMPC), dipalmitoylphosphatidylcholine (DPPC), distearoylphosphatidylcholine (DSPC), 1-myristoyl-2-palmitoylphosphatidylcholine (MPPC), 1-palmitoyl-2-myristoylphosphatidylcholine (PMPC), 1-palmitoyl-2-stearoylphosphatidylcholine (PSPC), 1-stearoyl-2-palmitoylphosphatidylcholine (SPPC), 1,2-distearoyl-sn-glycero-3-phosphocholine (DAPC), 1,2-diarachidoyl-sn-glycero-3-phosphocholine (DBPC), 1,2-diicosanoyl-sn-glycero-3-phosphocholine (DEPC), palmitoyloleoylphosphatidylcholine (POPC), lysophosphatidylcholine, dilinoleoylphosphatidylcholine, distearoylphosphatidylethanolamine (DSPE), dimyristoylphosphatidylethanolamine (DMPE), dipalmitoylphosphatidylethanolamine (DPPE), palmitoyloleoylphosphatidylethanolamine (POPE), lysophosphatidylethanolamine, N1-[2-((1S)-1-[(3-aminopropyl)amino]-4-[di(3-amino-propyl)amino]butylcarboxamido)ethyl]-3,4-di[oleyloxy]-benzamide) (VL-5), dioctadecylamidoglycolspermine 4-tetrafluoroacetate (DOGS), 3β-[N—(N',N'-dimethylaminoethane)-carbamoyl] cholesterol (DC-Chol), 1,2-di-O-octadecenyl-3-trimethylammonium propane (DOTMA), 1,2-dioleyl-3-trimethylammonium-propane (DOTAP), (1,2-dioleyloxypropyl)-3-dimethylhydroxyethyl ammonium bromide (DORIE), 1,2-dimyristyloxy-propyl-3-dimethyl-hydroxyethyl ammonium bromide (DMRIE), 2,3-dioleyloxy-N-[2(sperminecarboxamido)ethyl]-N,N-dimethyl-1-propanaminium trifluoroacetate (DOSPA), N-(3-aminopropyl)-N,N-dimethyl-2,3-bis (dodecyloxy)-1-propanammonium bromide (GAP-DLRIE), N-t-butyl-N'-tetradecyl-3-tetradecylaminopropionamidine (diC14-amidine), ethylphosphocholine (Ethyl PC), dimethyldioctadecylammonium bromide (DDAB), N4-cholesteryl-spermine (GL67), 1,2-dioleyloxy-3-dimethylaminopropane (DODMA), D-Lin-MC3-DMA (MC3, DLin-MC3-DMA), DLin-KC2-DMA, and DLin-DMA.

The hydrophilic substance may be a lipoprotein, a transmembrane protein, a peptide, or a polymer, and preferably may be apolipoprotein A or E. Further, the polymer may be poly(lactic-co-glycolic acid) (PLGA).

In the mixing channel, the hydrophilic substance and the hydrophobic substance may be mixed with each other.

The outlet channel may be a channel through which the produced nanoparticles are discharged.

The micropost may or may not be connected to a wall forming the mixing channel, and may be at least one selected from the group consisting of polyhedra, truncated polyhedra, polygonal columns, and modified shapes thereof, and preferably may be a square column.

The microposts may be arranged in one or more rows in the direction of the fluid flow, and preferably in six or more rows in the direction of the fluid flow. Further, one or more microposts may be arranged in a direction different from the direction of the fluid flow in one row, and preferably 1 to 6 microposts may be arranged in a direction different from the direction of the fluid flow in one row, more preferably 1 to 6 microposts may be arranged in a direction perpendicular to the direction of the fluid flow in one row, and most preferably 1 to 2 microposts may be arranged in a direction perpendicular to the direction of the fluid flow in one row.

The plurality of microposts may not be arranged in a single row in the direction of the fluid flow, and the plurality of microposts may be arranged so as to partially or completely cover the gaps between microposts arranged in adjacent rows when viewed in the direction of the fluid flow.

The particle size may be adjusted by changing the Reynolds number for the fluid flow in the mixing channel. Further, the Reynolds number for the fluid flow in the mixing channel may be 12.5 to 200, and preferably 50 to 100.

The channel may have a height of 200 to 800 μm.

The flow blockage ratio in the device may be 0.2 to 0.8, preferably 0.35 to 0.65.

The polydispersity index of the produced nanoparticles may be 0.15 or less.

The present invention will be described in more detail through the following examples; however, the following examples are for the purpose of description only and are not intended to limit the scope of the present invention.

Example 1

Design of Device for Producing Nanoparticles

A microfluidic device was designed to produce reconstructed high-density nanoparticles by mixing hydrophobic and hydrophilic organic compounds (FIGS. 1 and 2). The microfluidic device includes three inlet channels and one outlet channel. In the central channel among the three inlet channels, hydrophobic phospholipids or hydrophobic drugs were introduced, and in the two channels on both sides, hydrophilic proteins or hydrophilic drugs were introduced. Further, a micropost structure was introduced inside the device to effectively mix the lipids and proteins.

Example 2

Effect of Single Micropost Structure

To confirm the mixing efficiency of hydrophobic and hydrophilic substances according to the presence, number, and arrangement of microposts placed inside the device, the distribution of hydrophobic substances inside the microfluidic device was analyzed using fluid dynamics techniques.

In the present invention, the inlet volume flow rate ratio refers to the ratio of the inlet volume flow rate of a fluid containing a hydrophilic substance to that of a fluid containing a hydrophobic substance, and the flow blockage ratio is defined as the ratio of the width of a micropost to the width of the entire channel in the first row along the flow direction of the fluid in the mixing channel.

The results were verified under conditions including a channel height of 200 μm, an inlet volume flow rate ratio of 1:5.5 (hydrophobic substance:hydrophilic substance), a Reynolds number (Re) of 50, a flow blockage ratio of 0.5, and a rectangular micropost size of 1000 μm×400 μm, as shown in FIGS. 2, 3 and 4. The number of microposts was designed to be uniformly distributed across the channel width, while maintaining the size of the microposts and keeping constant the width of the flow path between the microposts.

As shown in FIG. 2, it was confirmed that hydrophobic and hydrophilic substances were efficiently mixed by micro-vortices generated when the hydrophobic substance flowed through the micropost structure.

As shown in FIGS. 3 and 4, it was confirmed that, compared to the case without microposts, the mixing efficiency was improved by about 1.5 to 4.0 times depending on the number of microposts distributed.

[Table 1]

Mixing Efficiency According to the Number of Micropost Rows

| Number of micropost rows | Mixing efficiency |
|---|---|
| 0 | 0.26 |
| 2 | 0.78 |
| 4 | 0.95 |
| 6 | 0.98 |

As shown in FIG. 3 and Table 1 above, the mixing efficiency increased with the number of rows, and when the number of rows was six or more, an excellent mixing efficiency of 98% or higher was obtained.

[Table 2]

Mixing Efficiency According to the Number of Microposts in One Row

| Number of microposts in one row | Mixing efficiency |
|---|---|
| 0 | 0.26 |
| 1-2 | 0.98 |
| 2-3 | 0.68 |
| 3-4 | 0.54 |
| 4-5 | 0.44 |
| 5-6 | 0.39 |

As shown in FIG. 4 and Table 2 above, as the number of microposts located within the channel in one row increased, the mixing efficiency decreased, and the best mixing efficiency was obtained when the number was 1 to 2. Therefore, it was confirmed that the mixing efficiency varied depending on the number and arrangement of the microposts within the device, and in particular, the highest mixing efficiency was obtained when a single micropost structure was arranged in a staggered manner. The microposts were evenly arranged with respect to the channel width, while maintaining a constant width for the flow path between the microposts.

Example 3

Optimizing the Available Flow Rate Range and Flow Rate Ratio Range within the Device To optimize nanoparticle synthesis according to the flow rates and injection ratios of hydrophobic and hydrophilic substances within the device, the mixing efficiency was analyzed under various Reynolds numbers (Re) and flow rate ratio conditions.

To investigate the available flow rate range, the mixing efficiency was analyzed when the Reynolds number (Re) was varied from 12.5 to 200 at a channel height of 200 μm and an injection ratio of 1:5.5 in the device, and the results are shown in FIG. 5 and Table 3.

TABLE 3

| Reynolds number (Re) | Mixing efficiency |
|---|---|
| 12.5 | 0.92 |
| 2.5 | 0.97 |
| 50 | 0.98 |
| 100 | 0.98 |
| 200 | 0.95 |

As shown in Table 3 above, a mixing efficiency of 90% or more was obtained when the Reynolds number (Re) was in the range of 12.5 to 200, and a mixing efficiency of 98% was obtained when the Reynolds number (Re) was 50 and 100.

Further, the mixing efficiency was analyzed when the channel height was varied from 200 to 800 μm at an injection ratio of 1:5.5 and a Reynolds number (Re) of 50, and the results are shown in FIG. 6 and Table 4.

TABLE 4

| Channel height (μm) | Mixing efficiency |
|---|---|
| 200 | 0.98 |
| 400 | 0.98 |
| 600 | 0.97 |
| 800 | 0.95 |

As shown in Table 4 above, a mixing efficiency of 95% or higher was obtained when the channel height was in the range of 200 to 800 μm.

Further, the mixing efficiency was analyzed at a channel height of 200 μm and a Reynolds number (Re) of 50, while varying the injection ratio from 1:2.5 to 1:8.5, and the results are shown in FIG. 7 and Table 5.

TABLE 5

| Injection ratio | Mixing efficiency |
|---|---|
| 1:2.5 | 0.97 |
| 1:5.5 | 0.98 |
| 1:8.5 | 0.98 |

As shown in Table 5 above, a mixing efficiency of 97% or higher was obtained when the injection ratio was in the range of 1:2.5 to 1:8.5.

Example 4

Study on the Height of the Device for Increasing Mixing Efficiency

To maximize the mixing efficiency according to the height of the mixing channel of the device, the mixing efficiency was analyzed under different height conditions.

During the nanoparticle synthesis process using the device, when raw materials were injected at a relatively high flow rate (Re>50), strong shear stress was generated from the wall due to the narrow channel width.

In the case of proteins, several studies have reported that protein deformation, including aggregation, misfolding, and degradation, can be induced by the shear stress of fluid flow generated in external equipment. Such deformation of precursor proteins may change the structure, size, and even the function of the produced nanoparticles. In general, the range of deformation induced varies depending on the structure of the equipment that generates shear stress and the type and size of the material used. However, it has been reported that, in the case of proteins with a size of 1-10 nm (mass range of 20-300 kDa) such as insulin, enzymes, and immunoglobulins, the protein structure may be deformed at shear stress levels around 1000 dyne/cm$^2$ (Bekard, I., et al. The Effects of Shear Flow on Protein Structure and Function. Biopolymers, 95(11), 733-745 (2011)).

Therefore, in order to confirm whether precursor materials and nanoparticles are deformed by the shear stress (τw) generated through fluid flow in the device of the present invention, the shear stress generated according to each channel height was first calculated as follows.

$$\tau_w = \frac{6Q\mu}{h^2 w}$$

Herein, Q is the flow rate, and μ, h and w represent the viscosity of the fluid, the height of the channel cross-section, and the width of the channel cross-section, respectively.

TABLE 6

| Channel height (μm) | Shear force (dyne/cm2), Re 50 |
|---|---|
| 100 | 165.00 |
| 200 | 41.25 |
| 400 | 10.31 |
| 800 | 2.58 |

As shown in Table 6 above, it was confirmed that as the channel height in the device of the present invention decreases, the shear stress increases exponentially, but remains below the threshold of 1000 dyne/cm$^2$ for protein structural deformation.

However, when the channel height was 100 μm, the shear stress reached the range of 1000 dyne/cm$^2$ when Re was increased to 300. Further, considering that the size of the nanoparticles to be produced is in the range of 10-100 nm, which is larger than that of proteins, it can be concluded that precursor materials and nanoparticles are not deformed by shear stress when the channel height is 200 μm or greater.

Further, as shown in Table 7 below, as the height of the mixing channel of the device increases, the volume increases, which in turn increases the residence time (τres) of the mixed precursors in the channel at the same flow rate, and the mixing time (τmix) required for synthesizing the precursors. A specific calculation method for the residence time of the mixed substances in the channel is shown in FIG. 8. The mixing time (τmix) required for synthesizing the substances may be calculated according to the more dominant physical phenomenon-either convection or diffusion-in the device, and may be obtained as follows using the Peclet number (Pe), a dimensionless number representing the ratio of convection time to diffusion time.

$$Pe = \frac{t_{diffusion}}{t_{convection}}$$

In the device of the present invention, the Peclet number (Pe) is in the range of 100 to 5000, and based on this, it was confirmed that convective mixing is dominant. Therefore, the convective mixing time within the channel (τmix, convection) was calculated as follows (Velencia, P. et al. Single-Step Assembly of Homogenous Lipid-Polymeric and Lipid-Quantum Dot Nanoparticles Enabled by Microfluidic Rapid Mixing. ACS Nano 4, 3, 1671-1679 (2010), and Rhee, M. et al. Drop Mixing in a Microchannel for Lab-on-a-Chip Platforms. Langmuir, 24 (2), 590-601 (2008)).

$$\tau_{mix,convection} \sim 0.286 \times \frac{w^2}{D} \times \left(\frac{Pe}{L/w}\right)^{-2/3}$$

Herein, D represents the diffusion coefficient, and L and w represent the length of the channel and the width of the channel cross-section, respectively.

TABLE 7

| Channel height (μm) | Residence time (ms) Re 50 | Mixing time (ms) |
|---|---|---|
| 100 | 36 | 13 |
| 200 | 72 | 21 |
| 400 | 145 | 34 |
| 800 | 290 | 53 |

At this time, the residence time (τres) must be longer than the mixing time (τmix) so that the materials may be sufficiently mixed within the channel. As shown in Table 7 above, since the residence time is longer than the mixing time at all channel heights, it can be confirmed that sufficient mixing time is secured at a given channel height.

Further, the increase in mixing time according to the increase in channel height was calculated to be 53 ms at the maximum height of 800 μm as shown in Table 7 above, which falls within the aggregation time (τagg) range of 50 to 100 ms during which the injected materials start to clump and aggregate. Therefore, it may be regarded as the maximum channel height applicable to the device and production method of the present invention (see Rohit, K. et al. Microfluidic Platform for Controlled Synthesis of Polymeric Nanoparticles. Nano Letters, 8, 9, 2906-12, (2008) and Johnson, B. K. et al. Mechanism for Rapid Self-Assembly of Block Copolymer Nanoparticles. Physical Review Letters, 91(11), 118302-1-4 (2003)).

Therefore, as shown in Table 7 above, it may be seen that the optimal height of the mixing channel that can prevent agglomeration and non-uniform nanoparticle generation of the obtained nanoparticles within the device is 200 to 800 μm.

Example 5

Fluid Flow within the Device

According to the channel height and micro-pillar conditions, the device of the present invention was designed in two preparative examples as shown in Table 8 below.

TABLE 8

| | | Preparative Example 1 | Preparative Example 2 |
|---|---|---|---|
| Channel | Height (μm) | 200 | 200 |
| Micropost | Width × Length (μm) | 200 × 400 | 1000 × 400 |
| | Number of rows | 6 | 6 |
| | Number of microposts in one row | 5-6 | 1-2 |

To produce Preparative Examples 1 and 2 and confirm the mixing flow pattern of the hydrophobic and hydrophilic substances, the distribution of the substances was visualized with ink and observed under a microscope.

A fluid containing the hydrophobic substance was visualized using 6% ink in ethanol, and a fluid containing the hydrophilic substance was visualized using physiological saline, and the results are shown in FIG. 9.

As shown in FIG. 9, it can be seen that the hydrophobic substance and the hydrophilic substance are efficiently mixed by the microvortex generated when the hydrophobic substance flows through the micropost structure.

Example 6

Preparation of Reconstituted High Density Lipoprotein (rHDL) Nanoparticles

Using Preparative Examples 1 and 2 of Example 5, rHDL nanoparticles containing phospholipids (DMPC) and apolipoproteins were prepared by the following method.

A DMPC (1,2-dimyristoyl-sn-glycero-3-phosphocholine) solution in absolute ethanol and an apolipoprotein solution in PBS were prepared. Then, about 0.8 mL of the DMPC solution having a concentration of 0.83 mg/mL in absolute ethanol was filled into one syringe, and about 1.25 mL (about 2.5 mL in total) of the apolipoprotein solution having a concentration of 0.2 mg/mL in PBS was filled into two other syringes in equal amounts, and then bubbles in all syringes were removed.

Each syringe needle and the inlet channel of the device of the present invention were connected using a tube, and PBS was introduced at a rate of 1 mL/min using a syringe pump to wash the device. Thereafter, the injection flow rate of the DMPC solution was set to 0.8 mL/min and the injection flow rate of the apolipoprotein solution was set to 2.2 mL/min using the syringe pump. The produced rHDL nanoparticles were obtained through the outlet of the device, and the obtained nanoparticles were mixed with PBS, centrifuged using a 10K filter, and purified three times for 20 minutes at 4° C.

After dissolving the obtained rHDL nanoparticles in PBS, the change in particle size distribution due to nanoparticle aggregation was measured using the Zetasizer Nano ZS through dynamic light scattering (DLS), and the results are shown in FIG. 10.

As shown in FIG. 10, when the rHDL nanoparticles obtained from the devices of Preparative Examples 1 and 2 were dissolved in PBS and DLS data was measured, the sizes of the rHDL nanoparticles obtained in Preparative Examples 1 and 2 were measured as 18.78±4.58 nm and 13.06±0.00 nm, respectively.

Therefore, it can be seen that the nanoparticles of Preparative Example 2 using the device of the present invention have better uniformity compared to the nanoparticles of Preparative Example 1 using the conventional device.

Example 7

Method for Producing Lipid-Polymer Nanoparticles Using the Device

Using Preparative Example 2, lipid-polymer nanoparticles containing polymer poly(lactic-co-glycolic acid) (PLGA), phospholipid 1,2-dipalmitoyl-sn-glycero-3-phosphocholine (DPPC), and PEGylated phospholipid 1,2-distearoyl-sn-glycero-3-phosphoethanolamine-N-[methoxy (polyethylene glycol)-2000] (DSPE-PEG2000) were prepared by the following method.

PLGA was prepared as a solution in anhydrous acetonitrile (ACN), and 5 mL of the solution was filled into a syringe. DPPC was dissolved in absolute ethanol, and DSPE-PEG2000 was prepared as an aqueous solution using deionized water (DW).

The mixing ratio of the two phospholipids was DPPC: DSPE-PEG2000=1:2 (w/w), and the final solution was adjusted to contain 4% ethanol, after which 5 mL was filled into a syringe. Nanoparticles were obtained under the two synthesis conditions shown in Table 9 below. The obtained nanoparticles were purified with DW (deionized water; ultrapure water without ions).

TABLE 9

| Synthetic condition | Re | PLGA:lipid (weight ratio) | PLGA (mg) | DPPC (mg) | DSPE-PEG2000 (mg) |
|---|---|---|---|---|---|
| 1 | 50 | 10:1 | 30 | 1 | 2 |
| 2 | 250 | 5:1 | 15 | 1 | 2 |

The results of measuring the particle size distribution of the nanoparticles obtained under the two synthetic conditions are shown in FIG. 11. For the nanoparticles obtained under synthetic conditions 1 and 2, the particle sizes measured by dynamic light scattering (DLS) were 124±5.3 nm and 56±4.4 nm, respectively, and the particle size uniformity measured by the polydispersity index (PDI) was confirmed to be 0.05 and 0.13, respectively. Generally, the lower the polydispersity index, the better the uniformity, and since uniformity is considered secured when the polydispersity index is 0.15 or less, it can be seen that the nanoparticles produced under the above synthetic conditions have uniformity.

Therefore, it can be seen that, using the device of the present invention, nanoparticles having different sizes may be produced depending on the injection flow rate and the weight ratio of hydrophilic and lipophilic substances, and nanoparticles having a uniform particle size composed of various phospholipids and proteins may be produced.

Example 8

Optimization of Device Structural Design

In order to optimize the mixing efficiency according to the size of the designed channels and microposts within the device, the mixing efficiency was confirmed under various conditions including: 1) the initial spacing of microposts; 2) the spacing between microposts; 3) the longitudinal length of microposts; and 4) the flow blockage ratio within the structure of the device.

The mixing efficiency for each variable was confirmed under the conditions of a fixed channel height of 0.2 mm, a flow rate ratio of 1:5.5, and a Reynolds number of 50, and the results are shown in FIGS. 12 and 13.

TABLE 10

| Condition | Micropost initial spacing (mm) | Spacing between microposts (mm) | Micropost longitudinal length (mm) | Mixing efficiency |
|---|---|---|---|---|
| A (standard) | 2 | 0.4 | 0.4 | 0.98 |
| B | 1 | 0.4 | 0.4 | 0.98 |
| C | 4 | 0.4 | 0.4 | 0.97 |
| D | 2 | 0.2 | 0.4 | 0.96 |
| E | 2 | 0.8 | 0.4 | 0.98 |
| F | 2 | 0.4 | 0.2 | 0.97 |
| G | 2 | 0.4 | 0.8 | 0.97 |

As shown in FIG. 12 and Table 10 above, it was confirmed that the flow pattern of the fluid passing through the microposts designed in the channel did not change significantly regardless of the spacing and longitudinal length of the microposts, and that a high mixing efficiency (>0.95) was maintained under all conditions.

TABLE 11

| Flow blockage ratio | Mixing efficiency |
|---|---|
| 0.2 | 0.72 |
| 0.35 | 0.92 |
| 0.5 | 0.98 |
| 0.65 | 0.98 |
| 0.8 | 0.98 |

On the other hand, as shown in FIG. 13 and Table 11 above, the mixing efficiency increases as the flow blockage ratio (horizontal spacing ratio of the microposts in the channel) increases, and it was confirmed that the mixing efficiency remained consistently at 0.98 or higher when the blockage ratio was 0.5.

However, when the flow blockage ratio increases, the width of the channel also narrows, and accordingly, the shear stress increases proportionally. As calculated above, high shear stress may cause aggregation and deformation of organic substances present in the fluid when it exceeds a certain value (Bekard, I., et al. The Effects of Shear Flow on Protein Structure and Function. Biopolymers, 95(11), 733-745 (2011)). Considering that the shear stress rises to 1000 dyne/cm$^2$ or more when the flow rate is increased to Re 300 under the condition that the blockage ratio exceeds 0.65, it can be seen that the flow blockage ratio of the channel may be from 0.2 to 0.8, and preferably, when it is in the range of 0.35 to 0.65, high mixing efficiency can be maintained without being significantly affected by shear stress.

The invention claimed is:

1. A device for producing nanoparticles, comprising an inlet channel, a mixing channel, and an outlet channel, wherein the mixing channel includes at least one micropost that disturbs a straight flow of a fluid, wherein the inlet channel, the mixing channel and the outlet channel are sequentially arranged in a flow direction of the fluid, wherein the inlet channel comprises a channel through which a hydrophilic substance is introduced and a channel through which a hydrophobic substance is introduced, these channels being independently formed, and the outlet channel is a channel through which the produced nanoparticles are discharged, and the hydrophilic substance and the hydrophobic substance are mixed with each other in the mixing channel, wherein the direction of the channel through which the hydrophobic substance is introduced is the same as the flow direction of the fluid, and the channels through which the hydrophilic substance is introduced comprise two channels provided on opposite sides of the flow direction of the fluid, each extending in a direction intersecting the flow direction of the fluid, wherein a section having a width narrower than that of the mixing channel is formed over a predetermined length between one of the mixing channels and an adjacent mixing channel, and wherein the micropost includes a plane facing the flow of the fluid.

2. The device according to claim 1, wherein the microposts are arranged in six or more rows in the flow direction of the fluid, or one or a plurality of microposts in one row are arranged in a direction different from the flow direction of the fluid.

3. The device according to claim 1, wherein the microposts are arranged so as to partially or completely cover a gap between microposts arranged in adjacent rows when viewed along the flow direction of the fluid.

4. The device according to claim 1, wherein a Reynolds number for the fluid flow in the mixing channel is 12.5 to 300.

5. The device according to claim 1, wherein an inlet volume flow rate ratio between the hydrophobic substance and the hydrophilic substance is 1:2.5 to 1:8.5 (v/v).

6. The device according to claim 1, wherein a flow blockage ratio is 0.2 to 0.8.

7. The device according to claim 1, wherein the hydrophobic substance is one or more selected from the group consisting of poly(lactic-co-glycolic acid) (PLGA), polyethylene glycol (PEG), DSPE-PEG, 1,2-dioleoyl-sn-glycero-3-phosphatidylcholine (DOPC), egg phosphatidylcholine (EPC), dilauroylphosphatidylcholine (DLPC), 1,2-dimyristoyl-sn-glycero-3-phosphocholine (DMPC), dipalmitoylphosphatidylcholine (DPPC), distearoylphosphatidylcholine (DSPC), 1-myristoyl-2-palmitoylphosphatidylcholine (MPPC), 1-palmitoyl-2-myristoylphosphatidylcholine (PMPC), 1-palmitoyl-2-stearoylphosphatidylcholine (PSPC), 1-stearoyl-2-palmitoylphosphatidylcholine (SPPC), 1,2-distearoyl-sn-glycero-3-phosphocholine (DAPC), 1,2-diarachidoyl-sn-glycero-3-phosphocholine (DBPC), 1,2-diicosanoyl-sn-glycero-3-phosphocholine (DEPC), palmitoyloleoylphosphatidylcholine (POPC), lysophosphatidylcholine, dilinoleoylphosphatidylcholine, distearoylphosphatidylethanolamine (DSPE), dimyristoylphosphatidylethanolamine (DMPE), dipalmitoylphosphatidylethanolamine (DPPE), palmitoyloleoylphosphatidylethanolamine (POPE), lysophosphatidylethanolamine, N1-[2-((1S)-1-[(3-aminopropyl)amino]-4-[di (3-amino-propyl)amino]butylcarboxamido)ethyl]-3,4-di [oleyloxy]-benzamide) (VL-5), dioctadecylamidoglycolspermine 4-tetrafluoroacetate (DOGS), 3β-[N—(N',N'-dimethylaminoethane)-carbamoyl] cholesterol (DC-Chol), 1,2-di-O-octadecenyl-3-trimethylammonium propane (DOTMA), 1,2-dioleyl-3-trimethylammonium-propane (DOTAP), (1,2-dioleyloxypropyl)-3-dimethylhydroxyethyl ammonium bromide (DORIE), 1,2-dimyristyloxy-propyl-3-dimethyl-hydroxyethyl ammonium bromide (DMRIE), 2,3-dioleyloxy-N-[2 (sperminecarboxamido)ethyl]-N,N-dimethyl-1-propanaminium trifluoroacetate (DOSPA), N-(3-aminopropyl)-N,N-dimethyl-2,3-bis (dodecyloxy)-1-propanammonium bromide (GAP-DLRIE), N-t-butyl-N'-tetradecyl-3-tetradecylaminopropionamidine (diC14-amidine), ethylphosphocholine (Ethyl PC), dimethyldioctadecylammonium bromide (DDAB), N4-cholesteryl-spermine (GL67), 1,2-dioleyloxy-3-dimethylaminopropane (DODMA), D-Lin-MC3-DMA (MC3, DLin-MC3-DMA), DLin-KC2-DMA, and DLin-DMA.

8. The device according to claim 1, wherein the hydrophilic substance is any one of a lipoprotein, a transmembrane protein, a peptide, or a polymer, and wherein the polymer is poly(lactic-co-glycolic acid) (PLGA).

9. The device according to claim 8, wherein the hydrophilic substance is apolipoprotein A or apolipoprotein E.

10. A method for producing nanoparticles, using the device for producing nanoparticles of claim 1, the method comprising:

introducing the hydrophobic substance and the hydrophilic substance into the inlet channel;

forming vortices in the hydrophobic substance and the hydrophilic substance by the microposts in the mixing channel; and forming nanoparticles including the hydrophobic substance and the hydrophilic substance, wherein in the step of forming vortices, a Reynolds number of the fluid flow is varied to control a particle size of the nanoparticles produced in the step of forming the nanoparticles.

11. The method according to claim 10, wherein the inlet channel includes a channel through which the hydrophilic substance is introduced and a channel through which the hydrophobic substance is introduced.

12. The method according to claim 11, wherein the hydrophobic substance is introduced in the same direction as the flow direction of a fluid, and the hydrophilic substance is introduced in a direction different from the flow direction of the fluid.

13. The method according to claim 10, wherein the Reynolds number for the fluid flow in the mixing channel is controlled to be 12.5 to 300.

14. The method according to claim 12, wherein an inlet volume flow rate ratio between the hydrophobic substance and the hydrophilic substance is 1:2.5 to 1:8.5 (v/v).

15. The method according to claim 10, wherein a flow blockage ratio is 0.35 to 0.65.

16. A nanoparticle obtained by the method for producing nanoparticles according to claim 10.

* * * * *